United States Patent
Hayes et al.

(10) Patent No.: US 11,780,460 B2
(45) Date of Patent: Oct. 10, 2023

(54) DETERMINING CONTROL OPERATIONS FOR AN AUTONOMOUS VEHICLE

(71) Applicant: GHOST AUTONOMY INC., Mountain View, CA (US)

(72) Inventors: John Hayes, Mountain View, CA (US); Volkmar Uhlig, Cupertino, CA (US); Akash J. Sagar, Redwood City, CA (US); Nima Soltani, Los Gatos, CA (US); Feng Tian, Foster City, CA (US)

(73) Assignee: GHOST AUTONOMY INC., Mountain View, CA (US)

(*) Notice: Subject to any disclaimer, the term of this patent is extended or adjusted under 35 U.S.C. 154(b) by 200 days.

(21) Appl. No.: 17/036,992

(22) Filed: Sep. 29, 2020

(65) Prior Publication Data
US 2021/0094576 A1 Apr. 1, 2021

Related U.S. Application Data

(60) Provisional application No. 62/908,007, filed on Sep. 30, 2019.

(51) Int. Cl.
| | |
|---|---|
| *B60W 60/00* | (2020.01) |
| *B60W 40/02* | (2006.01) |
| *G06T 7/20* | (2017.01) |
| *G06V 10/764* | (2022.01) |
| *G06V 10/82* | (2022.01) |
| *G06V 20/56* | (2022.01) |

(52) U.S. Cl.
CPC .......... *B60W 60/001* (2020.02); *B60W 40/02* (2013.01); *B60W 60/0015* (2020.02); *G06T 7/20* (2013.01); *G06V 10/764* (2022.01); *G06V 10/82* (2022.01); *G06V 20/56* (2022.01); *B60W 2420/42* (2013.01); *B60W 2556/10* (2020.02); *G06T 2207/30252* (2013.01)

(58) Field of Classification Search
CPC .... G06T 7/70; G06T 7/73; G06T 7/74; G06T 7/75; G06T 7/77; G06T 2207/30252; G06V 20/56; G06V 20/58; G06V 20/582; G06V 20/584; G06V 20/586; G06V 20/588; B60W 60/0027; B60W 60/00272; B60W 60/00274; B60W 60/00276
See application file for complete search history.

(56) References Cited

U.S. PATENT DOCUMENTS

| | | | | |
|---|---|---|---|---|
| 2009/0169102 | A1* | 7/2009 | Zhang | G06T 5/002 382/167 |
| 2019/0332120 | A1* | 10/2019 | Choi | G01S 13/931 |
| 2021/0031831 | A1* | 2/2021 | Yoshizaki | B62D 15/025 |
| 2021/0053580 | A1* | 2/2021 | Horiguchi | B60W 50/0097 |
| 2021/0398291 | A1* | 12/2021 | Sasaki | G06T 5/003 |
| 2022/0126863 | A1* | 4/2022 | Moustafa | B60W 40/04 |

* cited by examiner

Primary Examiner — Russell Frejd
Assistant Examiner — Sara J Lewandroski

(57) ABSTRACT

Determining control operations for an autonomous vehicle may include receiving, by an operational model, an operational model input based on camera data from one or more cameras of an automated vehicle; determining, by the operational model, based on the input, a current environmental state and a predicted environmental state; providing, to a rules module, a differential between the current environmental state and a previously predicted environmental state; and determining, based on the rules module, one or more control operations for the automated vehicle.

14 Claims, 11 Drawing Sheets

DETERMINING CONTROL OPERATIONS FOR AN AUTONOMOUS VEHICLE

CROSS-REFERENCE TO RELATED APPLICATIONS

This application claims priority to U.S. Provisional Patent Application No. 62/908,007, filed Sep. 30, 2019, which is hereby incorporated by reference in its entirety.

BACKGROUND

Field of the Invention

The field of the invention is vehicle automation, or, more specifically, methods, apparatus, autonomous vehicles, and products for determining control operations for an autonomous vehicle.

Description of Related Art

Autonomous vehicles implement machine learning systems. It is unfeasible to train a single end-to-end model do make driving decisions.

SUMMARY

Determining control operations for an autonomous vehicle may include receiving, by an operational model, an operational model input based on camera data from one or more cameras of an automated vehicle; determining, by the operational model, based on the input, a current environmental state and a predicted environmental state; providing, to a rules module, a differential between the current environmental state and a previously predicted environmental state; and determining, based on the rules module, one or more control operations for the automated vehicle.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
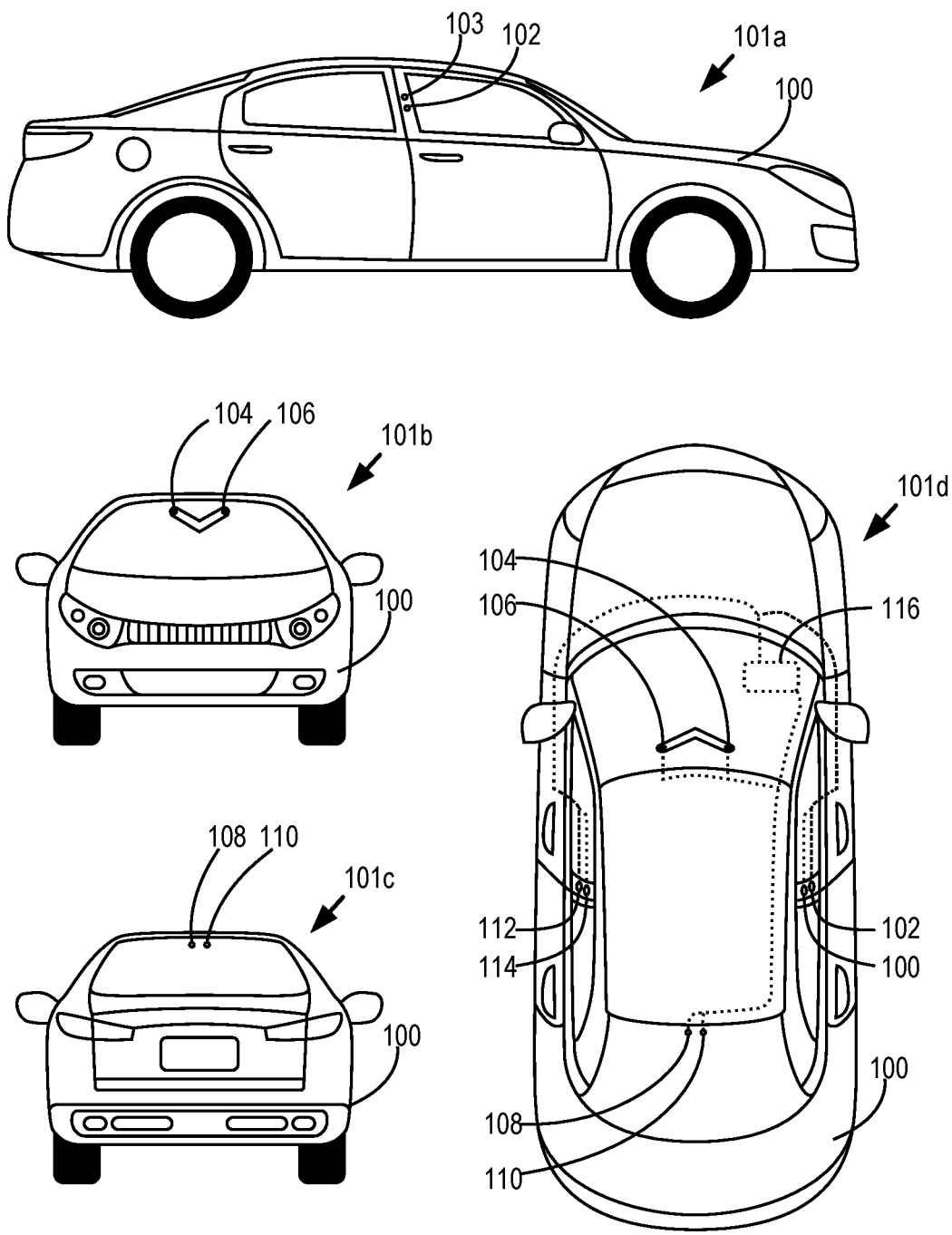
FIG. 1 shows example views of an autonomous vehicle for determining control operations for an autonomous vehicle.

Determining control operations for an autonomous vehicle may be implemented in an autonomous vehicle. Accordingly, FIG. 1 shows multiple views of an autonomous vehicle 100 configured for determining control operations for an autonomous vehicle according to embodiments of the present invention. Right side view 101a shows a right side of the autonomous vehicle 100. Shown in the right side view 101a are cameras 102 and 103, configured to capture image data, video data, and/or audio data of the environmental state of the autonomous vehicle 100 from the perspective of the right side of the car. Front view 101b shows a front side of the autonomous vehicle 100. Shown in the front view 101b are cameras 104 and 106, configured to capture image data, video data, and/or audio data of the environmental state of the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environmental state of the autonomous vehicle 100 from the perspective of the rear of the car. Top view 101d shows a rear side of the autonomous vehicle 100. Shown in the top view 101d are cameras 102-110. Also shown are cameras 112 and 114, configured to capture image data, video data, and/or audio data of the environmental state of the autonomous vehicle 100 from the perspective of the left side of the car.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine a operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for determining control operations for an autonomous vehicle may also include other vehicles, including motorcycles, planes, helicopters, unmanned aerial vehicles (UAVs, e.g., drones), or other vehicles as can be appreciated. Moreover, it is understood that additional cameras or other external sensors may also be included in the autonomous vehicle 100.

Determining control operations for an autonomous vehicle in accordance with the present invention is generally implemented with computers, that is, with automated computing machinery. For further explanation, therefore, FIG. 2 sets forth a block diagram of automated computing machinery comprising an exemplary automation computing system 116 configured for determining control operations for an autonomous vehicle according to embodiments of the present invention. The automation computing system 116 of FIG. 2 includes at least one computer Central Processing Unit (CPU) package 204 as well as random access memory 206 (RAM') which is connected through a high speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors as can be appreciated. As described herein, cameras may include a stolid state sensor 212 with a solid state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 212 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 214.

Stored in RAM 206 is an automation module 220. The automation module 220 may be configured to process sensor data from the sensors 212 to determine one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222. The autonomous vehicle control systems 223 are configured to affect the movement and operation of the autonomous vehicle 100. For example, the autonomous vehicle control systems 223 may turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor data 212 (e.g., sensor data 212 having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to a server 227. Such operations can include filtering, compression, encoding, decoding, or other operations as can be appreciated. The data processing module 226 may then communicate the processed and stored sensor data to the server 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows, AIX™, IBM's i OS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constrains, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
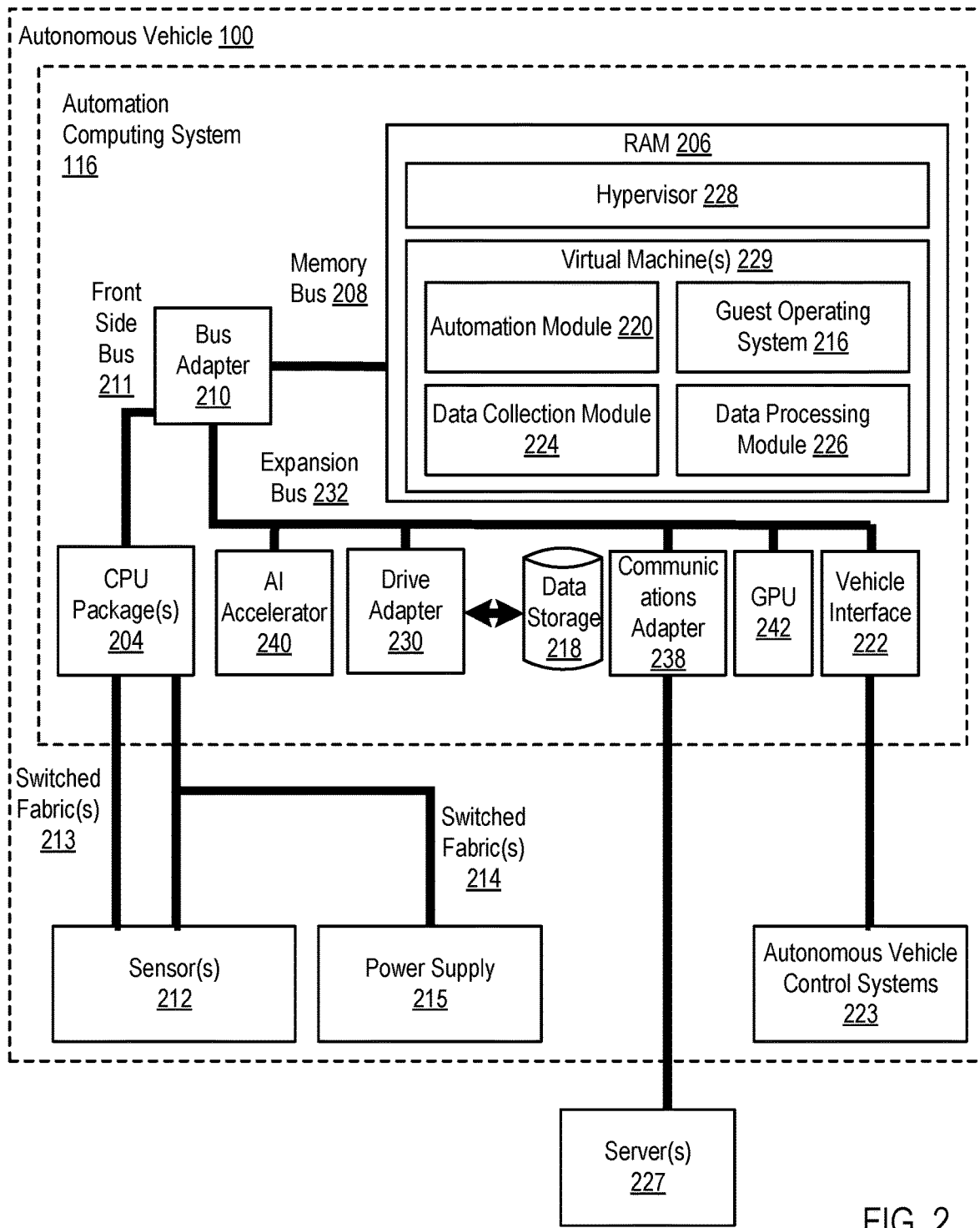
FIG. 2 is block diagram of an autonomous computing system for determining control operations for an autonomous vehicle.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to processor(s) 204 and other components of the automation computing system 116. Disk drive adapter 230 connects non-volatile data storage to the automation computing system 116 in the form of data storage 213. Disk drive adapters 230 useful in computers configured for determining control operations for an autonomous vehicle according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for determining control operations for an autonomous vehicle according to embodiments of the present invention include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed servers 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
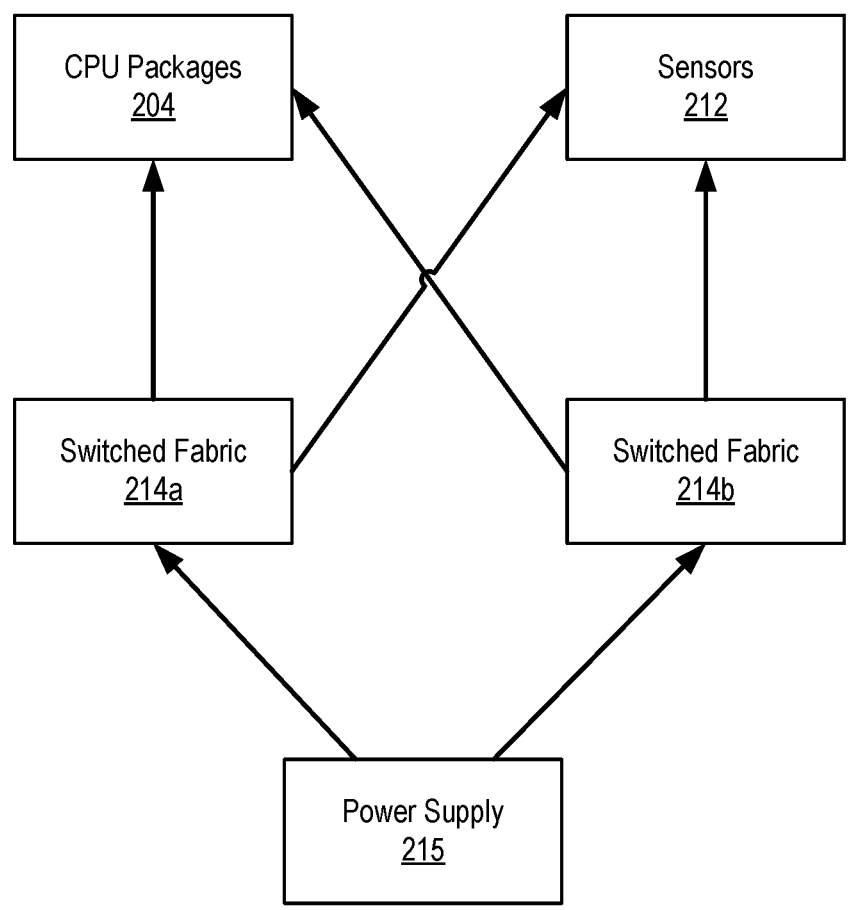
FIG. 3 is a block diagram of a redundant power fabric for determining control operations for an autonomous vehicle.

FIG. 3 shows an example redundant power fabric for determining control operations for an autonomous vehicle. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, it is understood that the approach shown by FIG. 3 can be modified to include additional switched fabrics 214.

Figure 4:
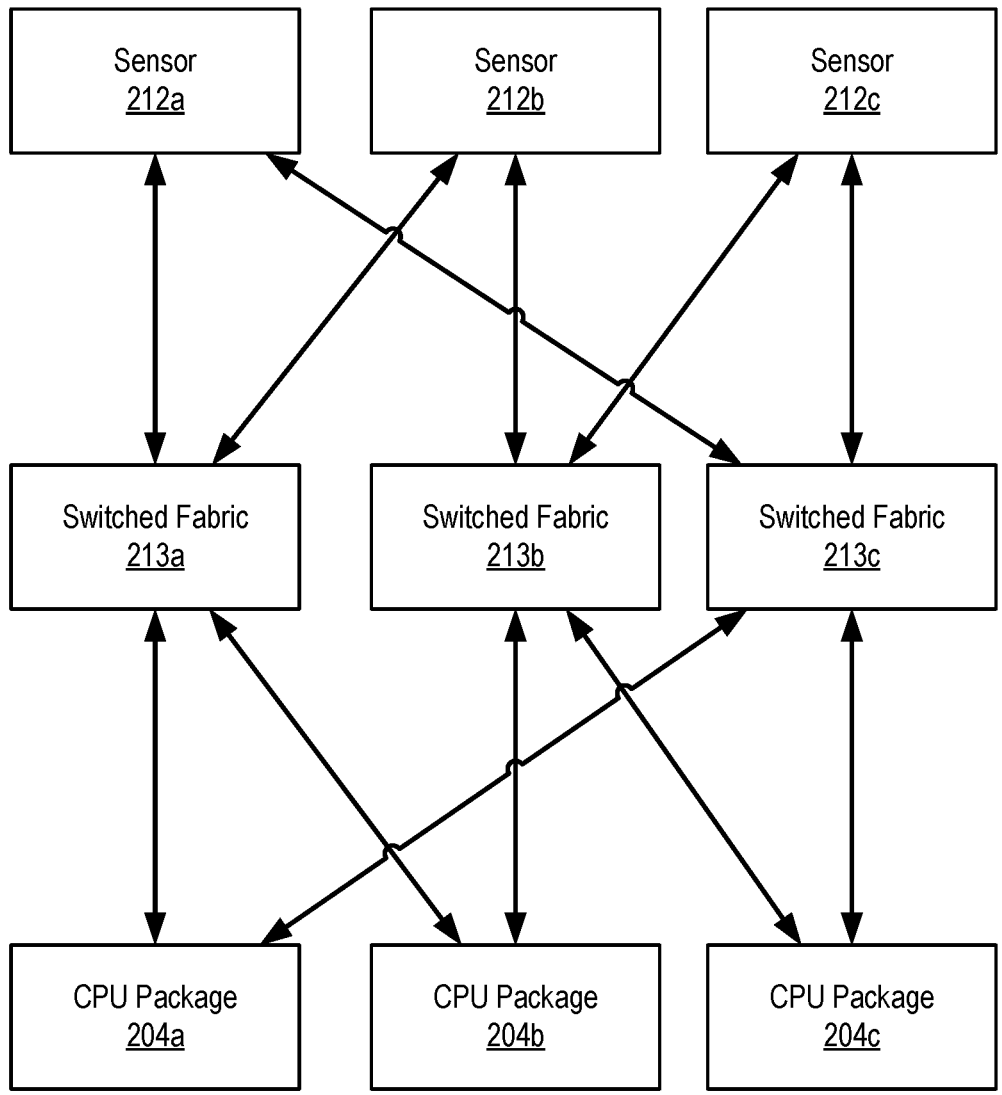
FIG. 4 is a block diagram of a redundant data fabric for determining control operations for an autonomous vehicle.

FIG. 4 is an example redundant data fabric for determining control operations for an autonomous vehicle. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy as can be appreciated by one skilled in the art.

Figure 5:
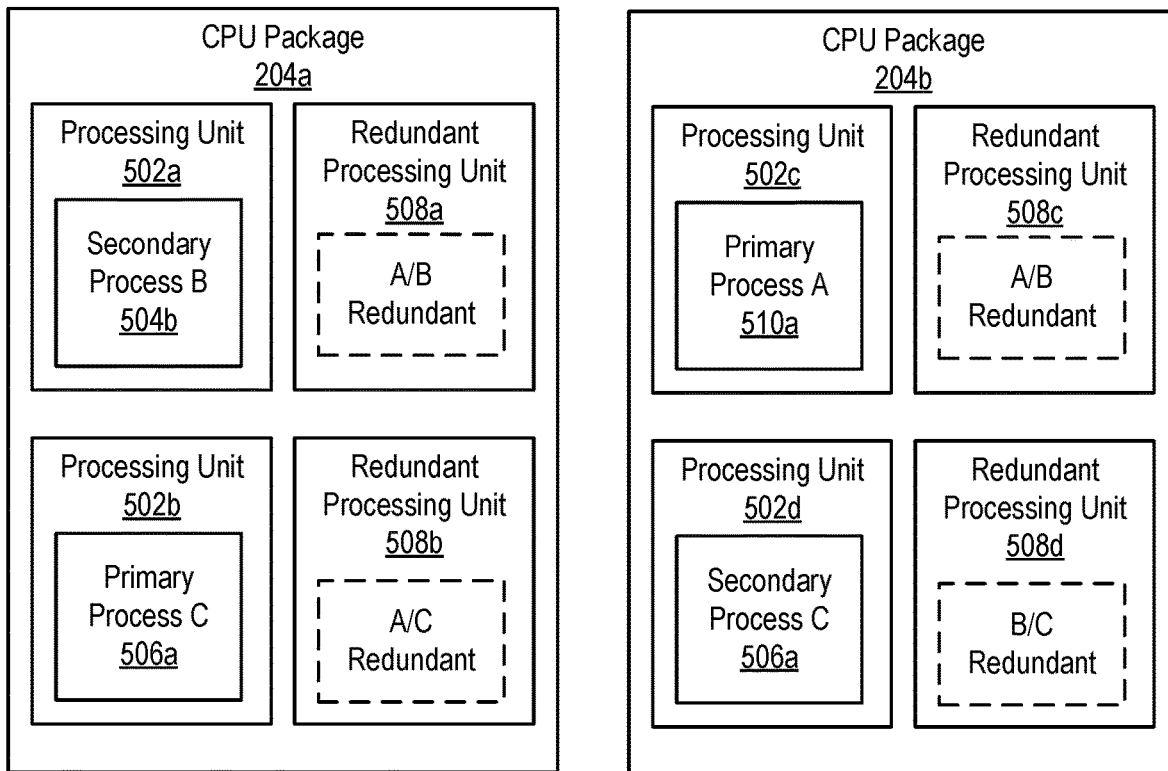
FIG. 5 is an example view of process allocation across CPU packages for determining control operations for an autonomous vehicle.
Figure 5:
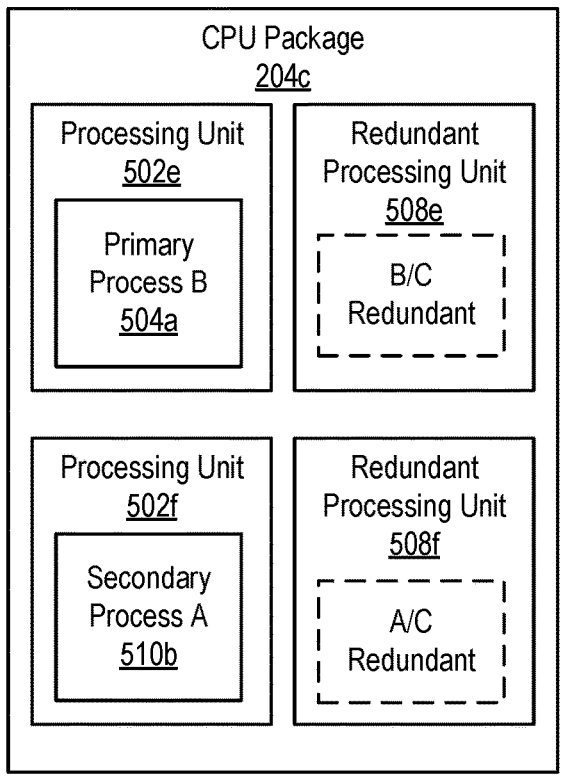

FIG. 5 is an example view of process allocation across CPU packages for determining control operations for an autonomous vehicle. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "A/B redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "A/B redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510a. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
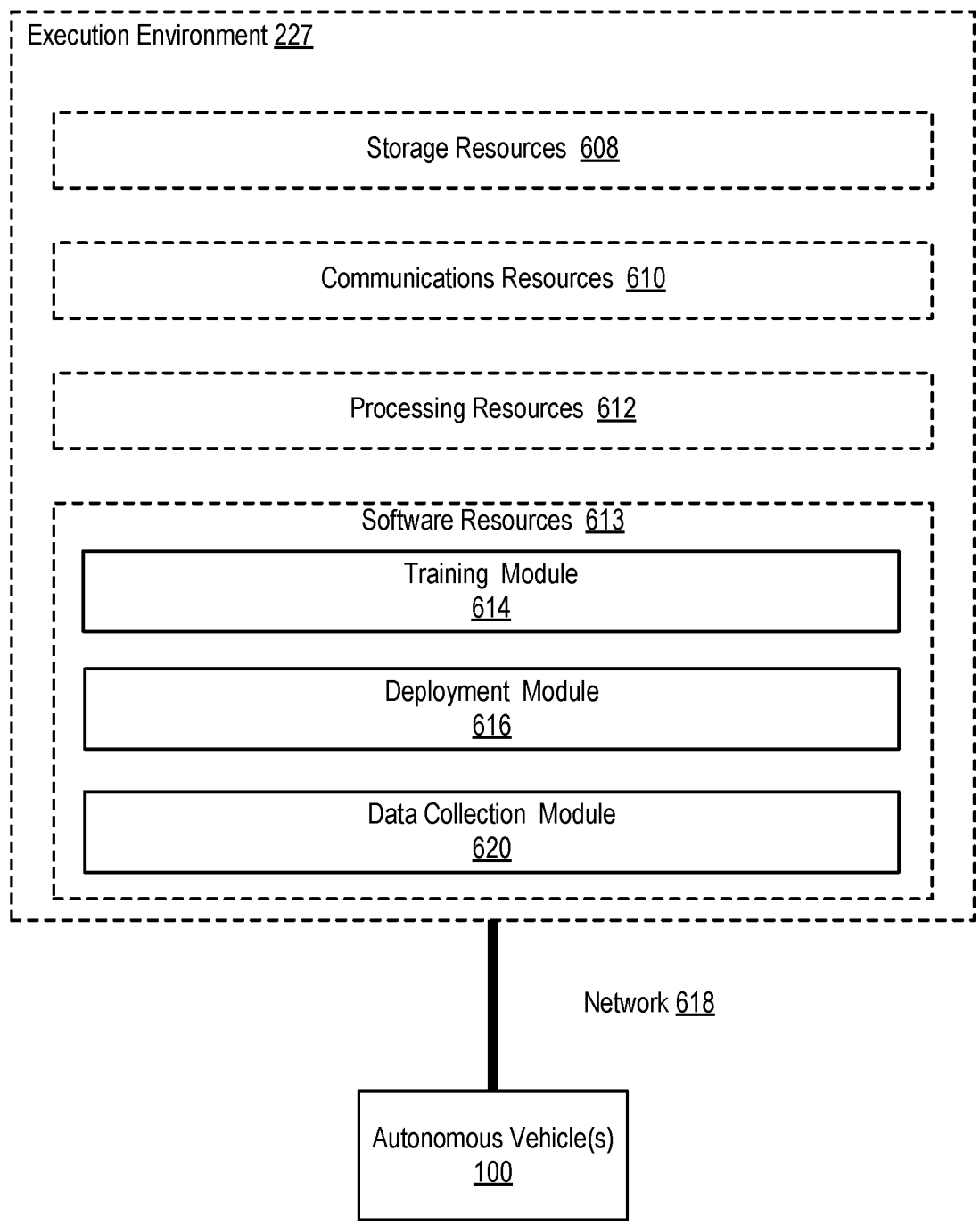
FIG. 6 is a block diagram of an example execution environment for determining control operations for an autonomous vehicle.

For further explanation, FIG. 6 sets forth a diagram of an execution environment 227 in accordance with some embodiments of the present disclosure. The execution environment 227 depicted in FIG. 6 may be embodied in a variety of different ways. The execution environment 227 may be provided, for example, by one or more cloud computing providers such as Amazon AWS, Microsoft Azure, Google Cloud, and others, including combinations thereof. Alternatively, the execution environment 227 may be embodied as a collection of devices (e.g., servers, storage devices, networking devices) and software resources that are included in a private data center. In fact, the execution environment 227 may be embodied as a combination of cloud resources and private resources that collectively form a hybrid cloud computing environment. Readers will appreciate that the execution environment 227 may be constructed in a variety of other ways and may even include resources within one or more autonomous vehicles or resources that communicate with one or more autonomous vehicles.

The execution environment 227 depicted in FIG. 6 may include storage resources 608, which may be embodied in many forms. For example, the storage resources 608 may include flash memory, hard disk drives, nano-RAM, 3D crosspoint non-volatile memory, MRAM, non-volatile phase-change memory ('PCM'), storage class memory ('SCM'), or many others, including combinations of the storage technologies described above. Readers will appreciate that other forms of computer memories and storage devices may be utilized as part of the execution environment 227, including DRAM, SRAM, EEPROM, universal memory, and many others. The storage resources 608 may also be embodied, in embodiments where the execution environment 227 includes resources offered by a cloud provider, as cloud storage resources such as Amazon Elastic Block Storage ('EBS') block storage, Amazon S3 object storage, Amazon Elastic File System ('EFS') file storage, Azure Blob Storage, and many others. The example execution environment 227 depicted in FIG. 6 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 6 also includes communications resources 610 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 610 may be configured to utilize a variety of different protocols and data communication fabrics to facilitate data communications. For example, the communications resources 610 may utilize Internet Protocol ('IP') based technologies, fibre channel ('FC') technologies, FC over ethernet ('FCoE') technologies, InfiniBand ('IB') technologies, NVM Express ('NVMe') technologies and NVMe over fabrics ('NVMeoF') technologies, and many others. The communications resources 610 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 6 also includes processing resources 612 that may be useful in executing computer program instructions and performing other computational tasks within the execution environment 227. The processing resources 612 may include one or more application-specific integrated circuits ('ASICs') that are customized for some particular purpose, one or more central processing units ('CPUs'), one or more digital signal processors ('DSPs'), one or more field-programmable gate arrays ('FPGAs'), one or more systems on a chip ('SoCs'), or other form of processing resources 612. The processing resources 612 may also be embodied, in embodiments where the execution environment 227 includes resources offered by a cloud provider, as cloud computing resources such as one or more Amazon Elastic Compute Cloud ('EC2') instances, event-driven compute resources such as AWS Lambdas, Azure Virtual Machines, or many others.

The execution environment 227 depicted in FIG. 6 also includes software resources 613 that, when executed by processing resources 612 within the execution environment 227, may perform various tasks. The software resources 613 may include, for example, one or more modules of computer program instructions that when executed by processing resources 612 within the execution environment 227 are useful in training neural networks configured to determine control autonomous vehicle control operations. For example, a training module 614 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 614 may provide a corpus of training data, or a selected subset of training data, to train the neural network. For example, the training module 614 may select particular subsets of training data associated with particular driving conditions, environment states, etc. to train the neural network.

The software resources 613 may include, for example, one or more modules of computer program instructions that when executed by processing resources 612 within the execution environment 227 are useful in deploying software resources or other data to autonomous vehicles 100 via a network 618. For example, a deployment module 616 may provide software updates, neural network updates, or other data to autonomous vehicles 100 to facilitate autonomous vehicle control operations.

The software resources 613 may include, for example, one or more modules of computer program instructions that when executed by processing resources 612 within the execution environment 227 are useful in collecting data from autonomous vehicles 100 via a network 618. For example, a data collection module 620 may receive, from autonomous vehicles 100, collected sensor 212, associated control operations, software performance logs, or other data. Such data may facilitate training of neural networks via the training module 614 or stored using storage resources 608.

Figure 7:
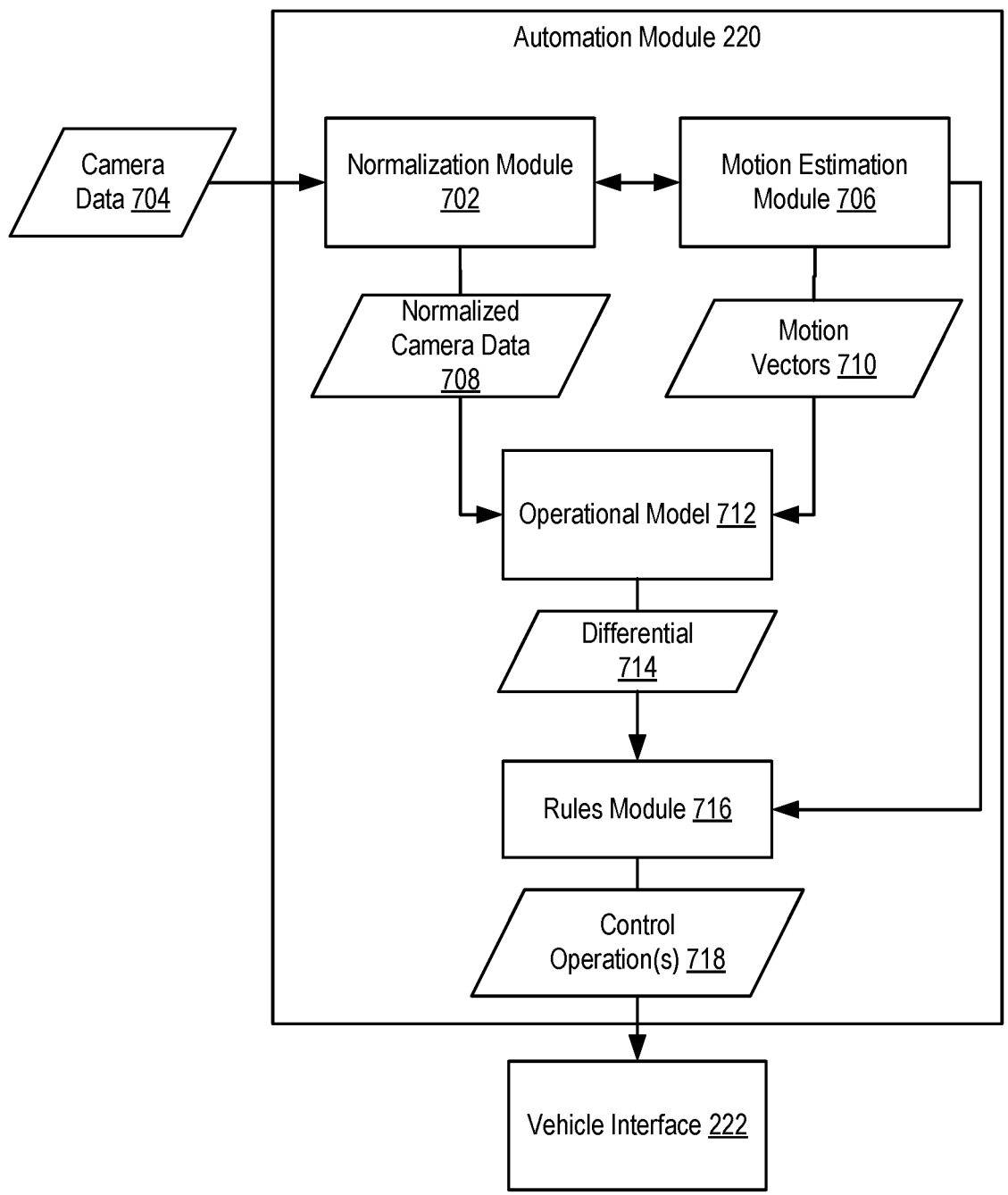
FIG. 7 is a diagram of an example automation module for determining control operations for an autonomous vehicle.

For further explanation, FIG. 7 sets forth an example communications flow for an automation module 220 for determining control operations for an autonomous vehicle according to various embodiments. The automation module 220 includes a normalization module 702 configured to receive camera data 704 (e.g., images, video comprising multiple frames or images) from one or more camera sensors 212 of the autonomous vehicle 100. The normalization module 702 may then apply one or more normalization operations to the camera data 704 (e.g., to each frame or image of the camera data 704). Such normalization operations may include transforming or normalizing the color space of the camera data 704. For example, camera data 704 encoded in a color space where luma or illumination information is included in the color information (e.g., Red, Green, Blue (RGB)) may be transformed into a color space where the luma or illumination values are separate from the color values (e.g., Hue, Saturation, Value (HSV)). Normalization operations may also include performing a spherical reprojection of the camera data 704, where each frame of planar projected camera data is reprojected onto a logical sphere. Normalization operations may also include stabilizing or centering the camera data 704 onto a registration point (e.g., a vanishing point).

The automation module 220 may also include a motion estimation module 706. The motion estimation module 706 is configured to accept, as input, camera data (e.g., normalized camera data 708 from the normalization module 702) and determine, for each pixel, a corresponding motion vector 710. For example, assuming a given frame of normalized camera data 708, the motion estimation module 706 may determine, for each pixel of the given frame, a corresponding motion vector 710 based on one or more preceding frames of the normalized camera data 708. The motion estimation module 706 may include a machine learning model that accepts, as input, a plurality of frames (e.g., of normalized camera data 708) and outputs, for each pixel of each frame, a corresponding motion vector 710. The motion estimation module 706 may provide one or more motion vectors 710 to the normalization module 702 to facilitate image stabilization or registration, or other operations.

The automation module 220 may also include an operational model 712 that accepts, as input, the normalized camera data 708 from the normalization module and the motion vectors 710 from the motion estimation module 706. For example, the operational model 712 may accept a window or time frame of normalized camera data 708 and motion vectors 710 for each pixel of each frame of the input normalized camera data 708. The operational model 712 may also accept input from other sensors 212 as can be appreciated.

The operational model 712 is configured to determine, based on the normalized camera data 708 and/or motion vectors 710, a current environmental state. The current environmental state may comprise a plurality of aggregated states from different perspectives (e.g., sensing spaces) of the automated vehicle 100. For example, the current environmental state relative to the automated vehicle 100 may comprise video data from the front side of the automated vehicle, left and right sides of the automated vehicle, and the rear side of the automated vehicle, etc. Accordingly, the current environmental state relative to the automated vehicle 100 may correspond to a current time.

Determining the current environmental state may comprise identifying, in the camera data 704, one or more visual anchors. The visual anchors may comprise image objects in the camera data 704. Image objects comprise two-dimensional projections of physical objects as captured by camera sensors 212. Such visual anchors may include lane markers, street signs, traffic signals, pedestrians or other persons, vehicles on the road, parked vehicles, etc. The visual anchors (e.g., image objects) may be identified based on the motion vectors 710. For example a cluster or grouping of pixels having identical or similar (e.g., having a degree of similarity above a threshold) motion vectors 710 may be identified as a visual anchor.

The operational model 712 may also be configured to determine a predicted environmental state based on the current environmental state and the motion vectors 710. As objects relative to the automated vehicle 100 move, their corresponding visual anchors (e.g., their two-dimensional projections in camera data 704) will change in pixel width, pixel height, and/or pixel area. Accordingly, the predicted environmental state may comprise a predicted arrangement of the visual anchors. The predicted arrangement of the visual anchors may be determined based their corresponding motion vectors 710. The current environmental state and the predicted environmental state may be determined using a same selected machine learning model.

For example, assuming that the operational model 712 is configured to operate at a 200 ms frequency (e.g., determine the current environmental state and predicted environmental state every 200 ms), the predicted environmental state may comprise a predicted environmental state for 200 ms in the future (e.g., a next iteration). Determining the predicted environmental state may include determining a position of one or more visual anchors based on their corresponding motion vectors 710. The predicted environmental state may be stored in a cache for use in a subsequent iteration or cycle of the operational model 712.

The operational model 712 may also be configured to determine a differential 714 between the current environmental state and a previously predicted environmental state. The previously predicted environmental state is a predicted environmental state determined by the operational model 712 at a previous cycle and corresponding to a same time as the current environmental state. For example, assuming a 200 ms frequency, at 200 ms the operational model 712 determines a current environmental state for 200 ms and a predicted environmental state for 400 ms. The predicted environmental state for 400 ms may be stored in a cache. The operational model 712 then determines a differential 714 between the current environmental state at 200 ms and a previously predicted environmental state for 200 ms (e.g., loaded from cache). At a next cycle at 400 ms, the operational model 712 determines a current environmental state for 400 ms and a predicted environmental state for 600 ms. The predicted environmental state for 600 ms may be stored in a cache. The operational model 712 then determines a differential 714 between the current environmental state at 400 ms and the previously predicted environmental state for 400 ms loaded from the cache.

The differential comprises a quantified representation of a difference between the current environmental state and the predicted environmental state. For example, determining the differential between the environmental state and the predicted environmental state may comprise determining a distance between multidimensional value representations of the current environmental state and the predicted environmental state. A lower differential indicates that objects in the environment relative to the automated vehicle 100 are moving and behaving as predicted. A higher differential indicates that objects in the environment relative to the automated vehicle 100 are moving and behaving unpredictably when compared to the predicted environmental state. The differential itself may be expressed as multiple values or attributes, each corresponding to a different visual anchor or other entity.

The operational module 220 may also include a rules module 716 configured to determine one or more control operations 718 for the autonomous vehicle 100. The rules module 716 may accept, as input, the differential 714. The rules module 716 may also accept as input, the current environmental state, the previously predicted environmental state corresponding to the current environmental state, other sensor data 212, or other data. The rules module 716 may be configured to determine the one or more control operations 718 to reduce the differential 714 between the current environmental state and the previously predicted environmental state corresponding to the current environmental state. For example, assuming that a lane marker is at differing locations in the current environmental state and previously predicted environmental state, a control operation 718 to move the automated vehicle 100 and reduce the distance between the current location of the lane marker in the current environmental state relative to the previously predicted environmental state.

The rules module 716 may use a selected machine learning model for determining control operations 718. The rules module 716 may also select a different machine learning model for determining control operations 718 based on the differential 714. For example, where a distance between multidimensional value representations of the current environmental state and the predicted environmental state exceeds a threshold, a different machine learning model may be selected for determining control operations 718.

The rules module 716 may also determine control operations 718 based on an input or override from the motion estimation module 706. For example, where a motion vector 710 indicates an object traveling toward the automated vehicle at a particular speed (e.g., exceeding a threshold), the motion vector 710 or an alert may be sent to the rules module 716 indicating that a collision or hazard is possible. This input from the motion estimation module 706 may override any determinations of control operations 718 based on other inputs (e.g., independent of the differential 714, the current environmental state and the previously predicted environmental state).

The determined control operations 718 may then be provided to the vehicle interface 222 in order to be effected by the corresponding components of the automated vehicle 100.

Figure 8:
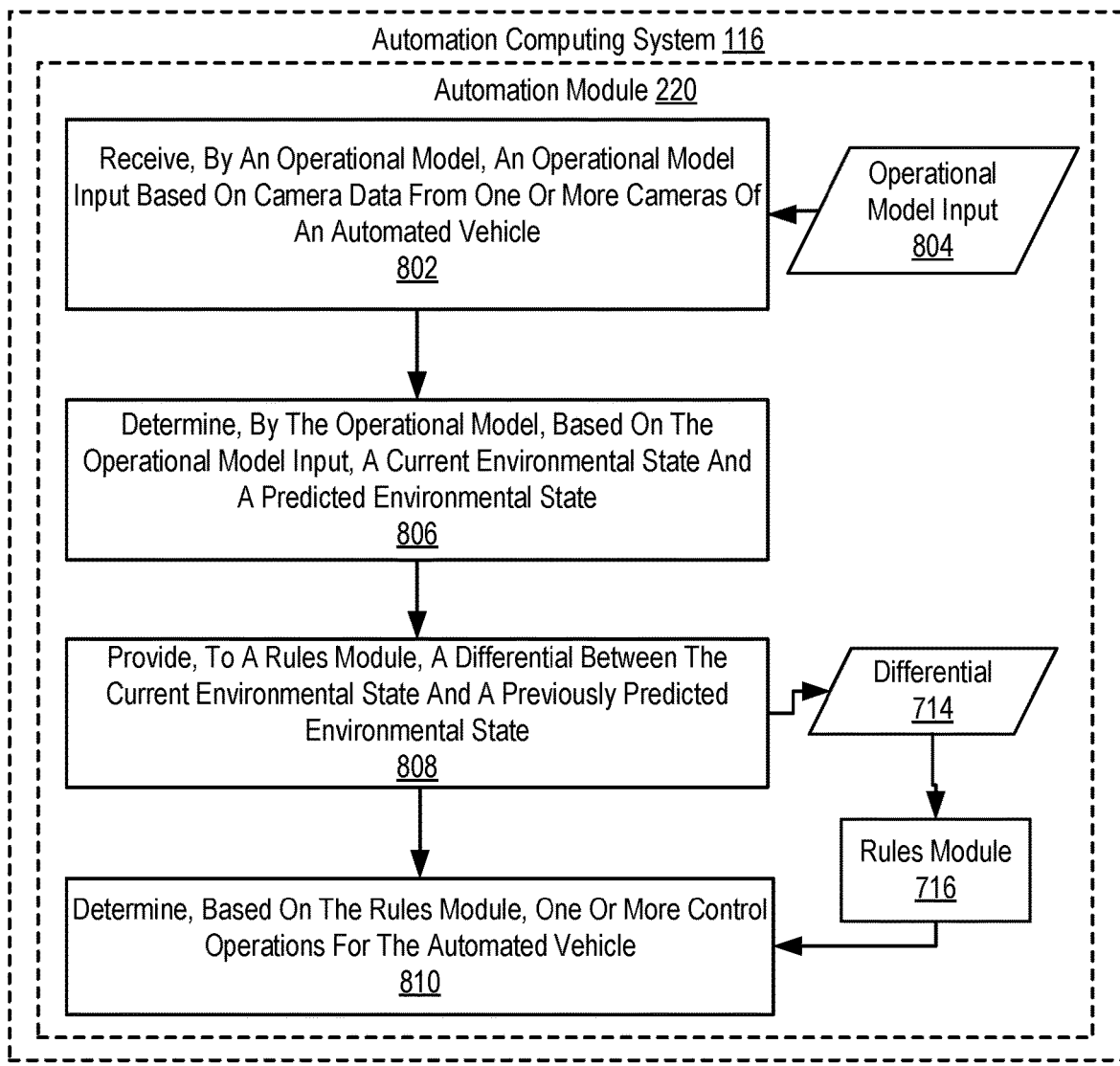
FIG. 8 is a flowchart of an example method for determining control operations for an autonomous vehicle.

For further explanation, FIG. 8 sets forth a flow chart illustrating an exemplary method for determining control operations for an autonomous vehicle that includes receiving 802, by an operational model 712 (e.g., of an automation module 220 of an automation computing system), an operational model input 804 based on camera data 704 from one or more cameras of an automated vehicle 100. The operational model input 804 may include camera data 704, normalized camera data 708, motion vectors 710, other sensor 212 data, and/or potentially other data. The operational model input 804 may correspond to a particular time window of input data (e.g., 200 ms of data, 500 ms of data, etc.). Where the operational model input 804 includes motion vectors 710, the motion vectors 710 may correspond to input camera data 704 or normalized camera data 708.

The method of FIG. 8 also includes determining 806, by the operational model 712, based on the operational model input 804, a current environmental state and a predicted environmental state. The current environmental state may comprise a plurality of aggregated states from different perspectives (e.g., sensing spaces) of the automated vehicle 100. For example, the current environmental state relative to the automated vehicle 100 may comprise video data from the front side of the automated vehicle, left and right sides of the automated vehicle, and the rear side of the automated vehicle, etc. Accordingly, the current environmental state relative to the automated vehicle 100 may correspond to a current time.

Determining the current environmental state may comprise identifying, in the normalized camera data 708 of the operational model input 804, one or more visual anchors. The visual anchors may comprise image objects in the normalized camera data 708. Image objects comprise two-dimensional projections of physical objects as captured by camera sensors 212. Such visual anchors may include lane markers, street signs, traffic signals, pedestrians or other persons, vehicles on the road, parked vehicles, etc. The visual anchors (e.g., image objects) may be identified based on the motion vectors 710. For example a cluster or grouping of pixels having identical or similar (e.g., having a degree of similarity above a threshold) motion vectors 710 may be identified as a visual anchor.

The predicted environmental state may comprise a predicted arrangement of the visual anchors. The predicted arrangement of the visual anchors may be determined based on their corresponding motion vectors 710. The current environmental state and the predicted environmental state may be determined using a same selected machine learning model.

For example, assuming that the operational model 712 is configured to operate at a 50 ms frequency (e.g., determine the current environmental state and predicted environmental state every 50 ms), the predicted environmental state may comprise a predicted environmental state for 200 ms in the future (e.g., multiple iterations in the future). It is understood that the predicted environmental state may correspond to a next iteration, an iteration multiple iterations in the future, or a combination of multiple iterations, Determining the predicted environmental state may include determining a position of one or more visual anchors based on their corresponding motion vectors 710.

The method of FIG. 8 also includes providing, to a rules module 716, a differential 714 between the current environmental state and a previously predicted environmental state. The previously predicted environmental state is a predicted environmental state determined by the operational model 712 at a previous cycle and corresponding to a same time as the current environmental state. For example, assuming a 200 ms frequency, at 200 ms the operational model 712 determines a current environmental state for 200 ms and a predicted environmental state for 400 ms. The predicted environmental state for 400 ms may be stored in a cache. The operational model 712 then determines a differential 714 between the current environmental state at 200 ms and a previously predicted environmental state for 200 ms (e.g., loaded from cache). At a next cycle at 400 ms, the operational model 712 determines a current environmental state for 400 ms and a predicted environmental state for 600 ms. The predicted environmental state for 600 ms may be stored in a cache. The operational model 712 then determines a differential 714 between the current environmental state at 400 ms and the previously predicted environmental state for 400 ms loaded from the cache.

The differential comprises a quantified representation of a difference between the current environmental state and the predicted environmental state. For example, determining the differential between the environmental state and the predicted environmental state may comprise determining a distance between multidimensional value representations of the current environmental state and the predicted environmental state. A lower differential indicates that objects in the environment relative to the automated vehicle 100 are moving and behaving as predicted. A higher differential indicates that objects in the environment relative to the automated vehicle 100 are moving and behaving unpredictably when compared to the predicted environmental state. The differential itself may be expressed as multiple values or attributes each corresponding to a different visual anchor or other entity.

The method of FIG. 8 also includes determining 810, based on the rules module 716, one or more control operations 718 for the autonomous vehicle 100. The rules module 716 may accept, as input, the differential 714. The rules module 716 may also accept as input, the current environmental state, the previously predicted environmental state corresponding to the current environmental state, other sensor data 212, or other data. The rules module 716 may be configured to determine the one or more control operations 718 to reduce the differential 714 between the current environmental state and the previously predicted environmental state corresponding to the current environmental state. For example, assuming that a lane marker is at differing locations in the current environmental state and previously predicted environmental state, a control operation 718 to move the automated vehicle 100 and reduce the distance between the current location of the lane marker in the current environmental state relative to the previously predicted environmental state. The determined control operations 718 may then be provided to a vehicle interface 222 to effect the control operations 718 by the automated vehicle 100.

Figure 9:
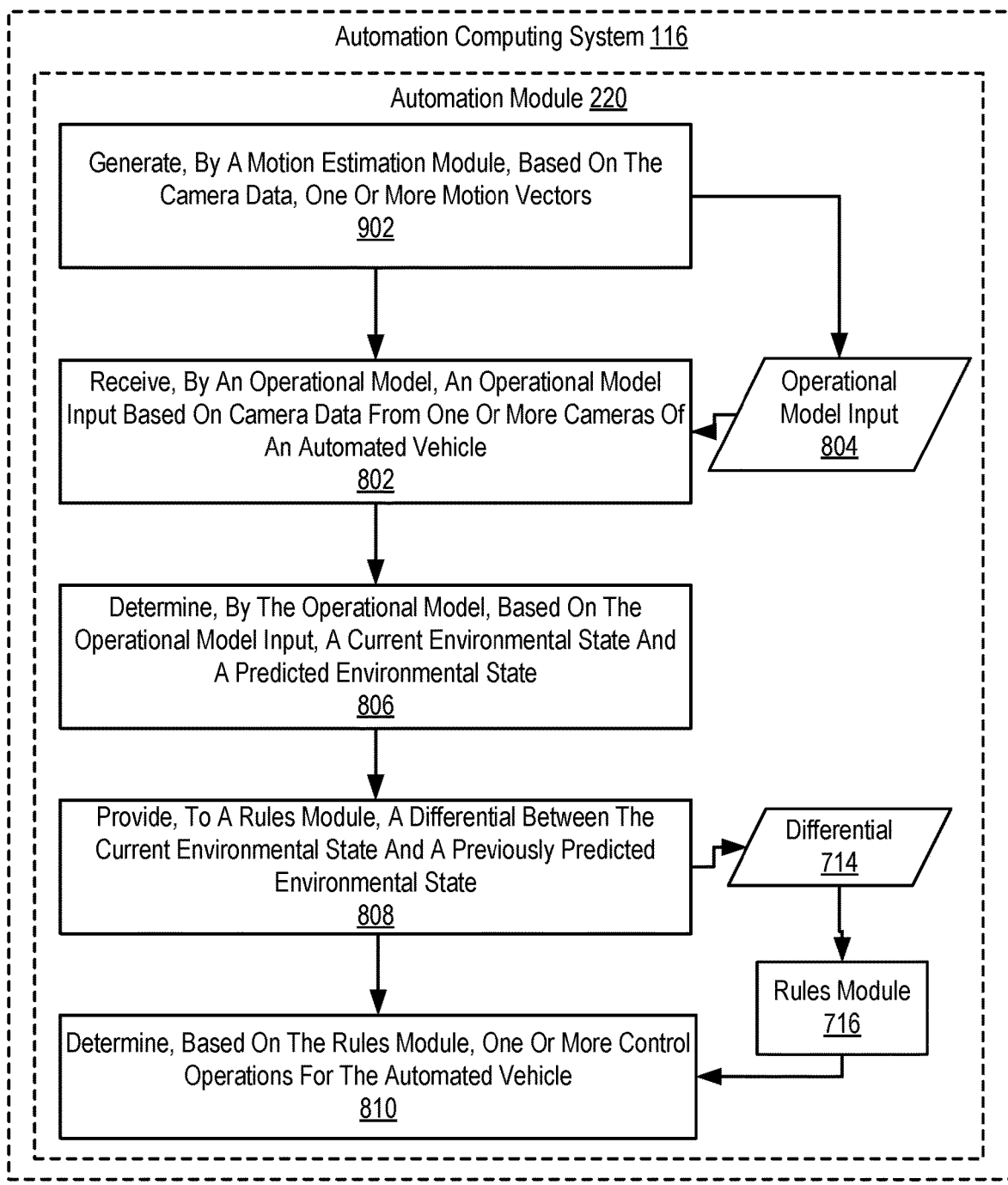
FIG. 9 is a flowchart of an example method for determining control operations for an autonomous vehicle.

For further explanation, FIG. 9 sets forth a flow chart illustrating an exemplary method for determining control operations for an autonomous vehicle that includes receiving 802, by an operational model 712 (e.g., of an automation module 220 of an automation computing system), an operational model input 804 based on camera data 704 from one or more cameras of an automated vehicle 100; determining 806, by the operational model 712, based on the operational model input 804, a current environmental state and a predicted environmental state; providing 808, to a rules module 712, a differential 714 between the current environmental state and a previously predicted environmental state; and determining 810, based on the rules module 716, one or more control operations 718 for the automated vehicle.

The method of FIG. 9 differs from FIG. 8 in that the method of FIG. 9 also includes generating 902, by a motion estimation module 706, based on the camera data 704, one or more motion vectors 710. The one or more motion vectors 710 may be generated based on normalized camera data 708 (e.g., normalized via a normalization module 702). The motion estimation module 706 is configured to accept, as input, camera data (e.g., normalized camera data 708 from the normalization module 702) and determine, for each pixel, a corresponding motion vector 710. For example, assuming a given frame of normalized camera data 708, the motion estimation module 706 may determine, for each pixel of the given frame, a corresponding motion vector 710 based on one or more preceding frames of the normalized camera data 708. The motion estimation module 706 may include a machine learning model that accepts, as input, a plurality of frames (e.g., of normalized camera data 708) and outputs, for each pixel of each frame, a corresponding motion vector 710. The motion vectors 710 are then included in the operational model input 804.

Figure 10:
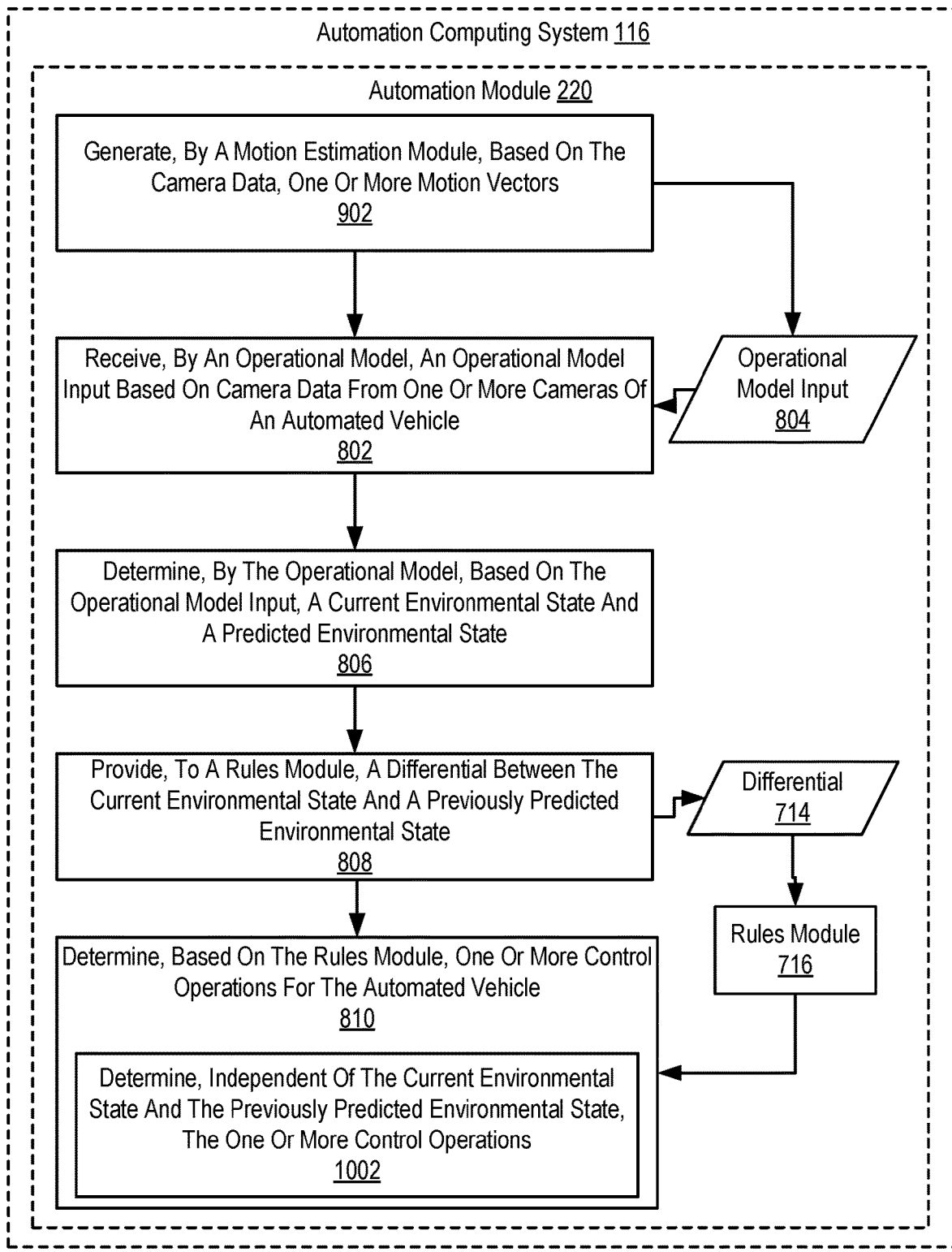
FIG. 10 is a flowchart of an example method for determining control operations for an autonomous vehicle.

For further explanation, FIG. 10 sets forth a flow chart illustrating an exemplary method for determining control operations for an autonomous vehicle that includes generating 902, by a motion estimation module 706, based on the camera data 704, one or more motion vectors 710; receiving 802, by an operational model 712, an operational model input 804 based on camera data 704 from one or more cameras of an automated vehicle 100; determining 806, by the operational model 712, based on the operational model input 804, a current environmental state and a predicted environmental state; providing 808, to a rules module 712, a differential 714 between the current environmental state and a previously predicted environmental state; and determining 810, based on the rules module 716, one or more control operations 718 for the automated vehicle 100.

The method of FIG. 10 differs from FIG. 9 in that determining 810, based on the rules module 716, one or more control operations 718 for the automated vehicle 100 includes determining 1002, independent of the current environmental state and the previously predicted environmental state, the one or more control operations 718. The rules module 716 may also determine control operations 718 based on an input or override from a motion estimation module 706. For example, where a motion vector 710 indicates an object traveling toward the automated vehicle at a particular speed (e.g., exceeding a threshold), the motion vector 710 or an alert may be sent to the rules module 716 indicating that a collision or hazard is possible. This input from the motion estimation module 706 may override any determinations of control operations 718 based on other inputs (e.g., independent of the differential 714, the current environmental state and the previously predicted environmental state).

Figure 11:
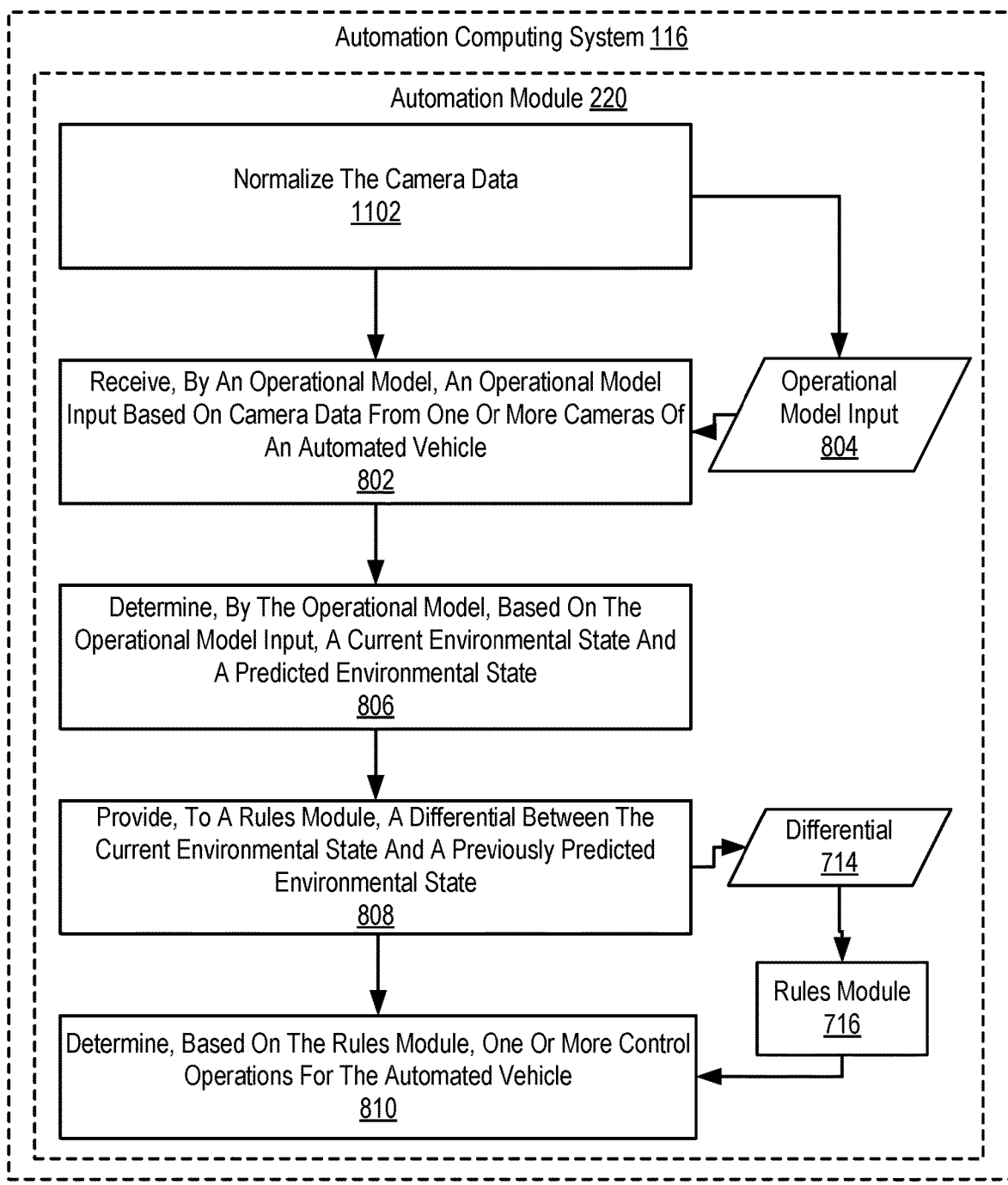
FIG. 11 is a flowchart of an example method for determining control operations for an autonomous vehicle.

For further explanation, FIG. 11 sets forth a flow chart illustrating an exemplary method for determining control operations for an autonomous vehicle that includes generating 902, by a motion estimation module 706, based on the camera data 704, one or more motion vectors 710; receiving 802, by an operational model 712, an operational model input 804 based on camera data 704 from one or more cameras of an automated vehicle 100; determining 806, by the operational model 712, based on the operational model input 804, a current environmental state and a predicted environmental state; providing 808, to a rules module 712, a differential 714 between the current environmental state and a previously predicted environmental state; and determining 810, based on the rules module 716, one or more control operations 718 for the automated vehicle 100.

The method of FIG. 11 differs from FIG. 8 in that the method of FIG. 9 also includes normalizing 1102 the camera data 704. For example, a normalization module 702 maybe configured to receive camera data 704 (e.g., images, video comprising multiple frames or images) from one or more camera sensors 212 of the autonomous vehicle 100. The normalization module 702 may then apply one or more normalization operations to the camera data 704 (e.g., to each frame or image of the camera data 704). Such normalization operations may include transforming or normalizing the color space of the camera data 704. For example, camera data 704 encoded in a color space where luma or illumination information is included in the color information (e.g., Red, Green, Blue (RGB)) may be transformed into a color space where the luma or illumination values are separate from the color values (e.g., Hue, Saturation, Value (HSV)). Normalization operations may also include performing a spherical reprojection of the camera data 704, where each frame of planar projected camera data is reprojected onto a logical sphere. Normalization operations may also include stabilizing or centering the camera data 704 onto a registration point (e.g., a vanishing point).

In view of the explanations set forth above, readers will recognize that the benefits of determining control operations for an autonomous vehicle according to embodiments of the present invention include:

Improved performance of an autonomous vehicle by determining control operations based on camera data captured by industry standard cameras.

Improved performance of an autonomous vehicle by allowing for safety-based overrides of control decisions using motion vectors in camera data.

Exemplary embodiments of the present invention are described largely in the context of a fully functional computer system for determining control operations for an autonomous vehicle. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for determining control operations for an autonomous vehicle, the method comprising:
   in response to an autonomous vehicle entering an autonomous driving mode, repeatedly performing at a predefined interval:
      receiving, by an operational model, an operational model input comprising video data from one or more cameras of the autonomous vehicle and one or more motion vectors associated with the video data;
      determining, by the operational model, based on the operational model input, a current environmental state and a predicted environmental state corresponding to a future time;
      determining, by a rules module and based on a differential between the current environmental state and a previously predicted environmental state corresponding to a same time as the current environmental state, one or more control operations for the autonomous vehicle for reducing the differential, wherein determining the one or more control operations comprises:
         providing the differential and the one or more motion vectors as inputs to the rules module;
         determining whether the one or more motion vectors satisfy one or more conditions;
         wherein when the one or more motion vectors satisfy the one or more conditions, determining, the rules module, the one or more control operations independent of the differential;
         wherein when the one or more motion vectors do not satisfy the one or more conditions, determining, by the rules module, the one or more control operations based on the differential; and
      executing the one or more control operations by the autonomous vehicle.

2. The method of claim 1, further comprising normalizing the video data.

3. The method of claim 1, further comprising:
   generating, by a motion estimation module, based on the video data, the one or more motion vectors; and
   wherein the rules module is configured to accept, from the motion estimation model, an input associated with the one or more motion vectors.

4. The method of claim 1, further comprising storing the predicted environmental state in a cache.

5. The method of claim 4, further comprising loading the previously predicted environmental state from the cache.

6. An autonomous vehicle for determining control operations for an autonomous vehicle, comprising:
an apparatus configured to perform steps comprising:
in response to the autonomous vehicle entering an autonomous driving mode, repeatedly performing at a predefined interval:
receiving, by an operational model, an operational model input comprising video data from one or more cameras of the autonomous vehicle and one or more motion vectors associated with the video data;
determining, by the operational model, based on the operational model input, a current environmental state and a predicted environmental state corresponding to a future time;
determining, by a rules module and based on a differential between the current environmental state and a previously predicted environmental state corresponding to a same time as the current environmental state, one or more control operations for the autonomous vehicle for reducing the differential, wherein determining the one or more control operations comprises:
providing the differential and the one or more motion vectors as inputs to the rules module;
determining whether the one or more motion vectors satisfy one or more conditions;
wherein when the one or more motion vectors satisfy the one or more conditions, determining, the rules module, the one or more control operations independent of the differential;
wherein when the one or more motion vectors do not satisfy the one or more conditions, determining, by the rules module, the one or more control operations based on the differential; and
executing the one or more control operations by the autonomous vehicle.

7. The autonomous vehicle of claim 6, wherein the steps further comprise:
generating, by a motion estimation module, based on the video data, the one or more motion vectors; and
wherein the rules module is configured to accept, from the motion estimation model, an input associated with the one or more motion vectors.

8. The autonomous vehicle of claim 6, wherein the steps further comprise normalizing the video data.

9. The autonomous vehicle of claim 6, wherein the steps further comprise:
storing the predicted environmental state in a cache; and
loading the previously predicted environmental state from the cache.

10. An apparatus for determining control operations for an autonomous vehicle, the apparatus configured to perform steps comprising:
in response to an autonomous vehicle entering an autonomous driving mode, repeatedly performing at a predefined interval:
receiving, by an operational model, an operational model input comprising video data from one or more cameras of the autonomous vehicle and one or more motion vectors associated with the video data;
determining, by the operational model, based on the operational model input, a current environmental state and a predicted environmental state corresponding to a future time;
determining, by a rules module and based on a differential between the current environmental state and a previously predicted environmental state corresponding to a same time as the current environmental state, one or more control operations for the autonomous vehicle for reducing the differential, wherein determining the one or more control operations comprises:
providing the differential and the one or more motion vectors as inputs to the rules module;
determining whether the one or more motion vectors satisfy one or more conditions;
wherein when the one or more motion vectors satisfy the one or more conditions, determining, the rules module, the one or more control operations independent of the differential;
wherein when the one or more motion vectors do not satisfy the one or more conditions, determining, by the rules module, the one or more control operations based on the differential; and
executing the one or more control operations by the autonomous vehicle.

11. The apparatus of claim 10, wherein the steps further comprise:
generating, by a motion estimation module, based on the video data, the one or more motion vectors; and
wherein the rules module is configured to accept, from the motion estimation model, an input associated with the one or more motion vectors.

12. The apparatus of claim 10, wherein the steps further comprise normalizing the video data.

13. The apparatus of claim 10, wherein the steps further comprise:
storing the predicted environmental state in a cache; and
loading the previously predicted environmental state from the cache.

14. A computer program product disposed upon a non-transitory computer readable medium, the computer program product comprising computer program instructions for determining control operations for an autonomous vehicle system modality switching in an autonomous vehicle that, when executed, cause a computer system of the autonomous vehicle to carry out the steps of:
in response to the autonomous vehicle entering an autonomous driving mode, repeatedly performing at a predefined interval:
receiving, by an operational model, an operational model input comprising video data from one or more cameras of the autonomous vehicle and one or more motion vectors associated with the video data;
determining, by the operational model, based on the operational model input, a current environmental state and a predicted environmental state corresponding to a future time;
determining, by a rules module and based on a differential between the current environmental state and a previously predicted environmental state corresponding to a same time as the current environmental state, one or more control operations for the autonomous vehicle for reducing the differential, wherein determining the one or more control operations comprises:
providing the differential and the one or more motion vectors as inputs to the rules module;
determining whether the one or more motion vectors satisfy one or more conditions;

wherein when the one or more motion vectors satisfy the one or more conditions, determining, the rules module, the one or more control operations independent of the differential;

wherein when the one or more motion vectors do not satisfy the one or more conditions, determining, by the rules module, the one or more control operations based on the differential; and executing the one or more control operations by the autonomous vehicle.

* * * * *